United States Patent [19]
Platz et al.

[11] 3,943,366
[45] Mar. 9, 1976

[54] COLLIMATOR FOR A RAY DIAGNOSING DEVICE

[75] Inventors: Winfried Platz, Ratsberg; Karl-Georg Heinzelmann, Uttenreuth, both of Germany

[73] Assignee: Siemens Aktiengesellschaft, Munich, Germany

[22] Filed: Jan. 12, 1973

[21] Appl. No.: 323,318

[30] Foreign Application Priority Data
Jan. 13, 1972 Germany............................ 2201417

[52] U.S. Cl. ............................................... 250/505
[51] Int. Cl.² ....................................... H01J 35/16
[58] Field of Search ........... 29/471.1; 156/205, 210; 250/251, 366, 367, 452, 503, 505

[56] References Cited
UNITED STATES PATENTS

| | | | |
|---|---|---|---|
| 2,894,322 | 7/1959 | Clair, Jr. ........................ | 29/471.1 X |
| 3,058,023 | 10/1962 | George ............................ | 250/251 |
| 3,356,555 | 12/1967 | Jackson .......................... | 156/205 |
| 3,407,300 | 10/1968 | Hansen ........................... | 250/505 |
| 3,543,384 | 12/1970 | Hansen ........................... | 29/471.1 |

*Primary Examiner*—Craig E. Church
*Attorney, Agent, or Firm*—V. Alexander Scher

[57] ABSTRACT

A collimator for a ray diagnosing device for taking pictures produced by gamma rays or similar penetrating rays consists of a honeycomblike constructed body with many holes, the walls of which absorb the rays. The invention is particularly characterized in that the walls of the collimator are made of strips which extend parallel to each other in their longitudinal directions and are so folded transversely to their longitudinal extension that when two strips are placed next to each other one side of a strip makes a series of holes with the adjacent side of the following strip, the holes having a symmetry axis which coincides with the line separating the two strips.

3 Claims, 4 Drawing Figures

U.S. Patent    March 9, 1976    3,943,366
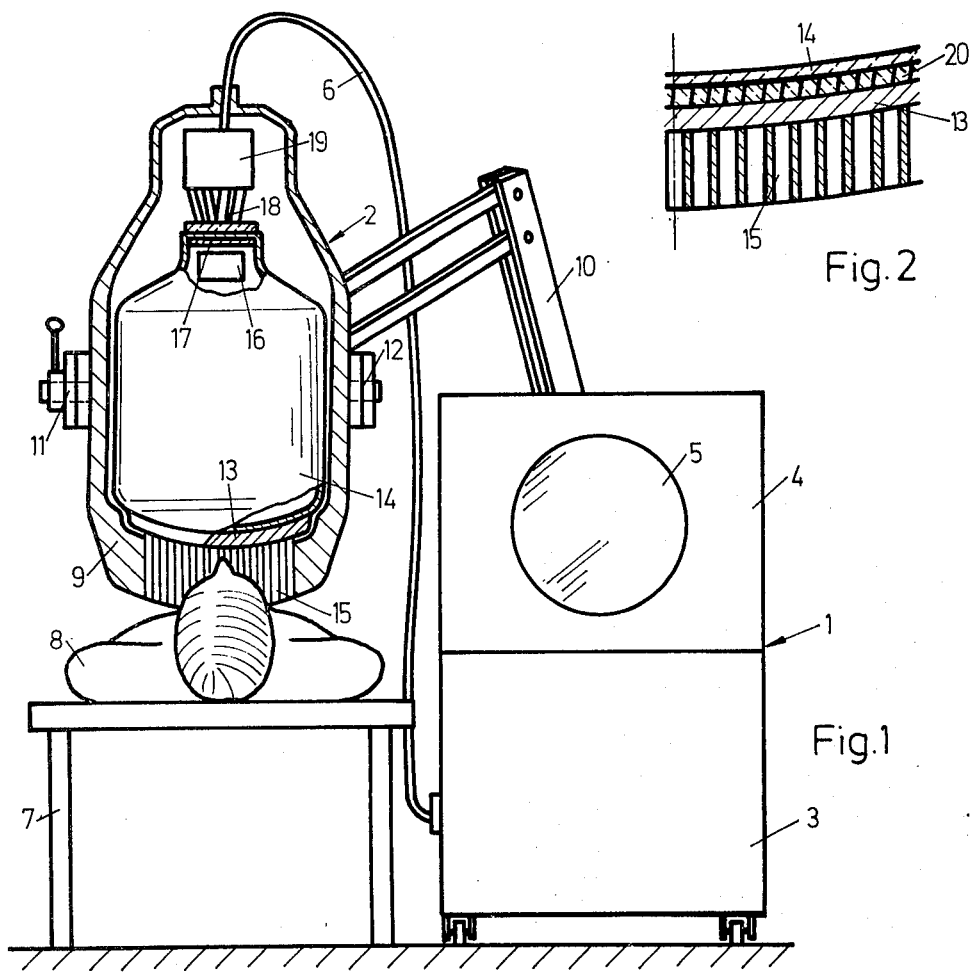
Fig. 2
Fig. 1
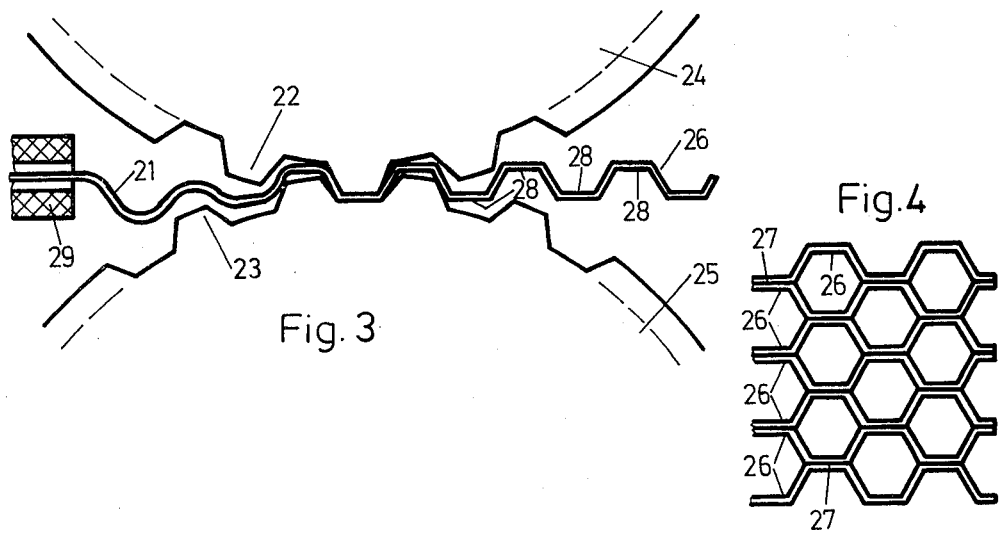
Fig. 3
Fig. 4

COLLIMATOR FOR A RAY DIAGNOSING DEVICE

This invention relates to a collimator for a ray diagnosing device for the taking of pictures produced by gamma rays or similar penetrating rays and consisting of a honeycomblike constructed body with many holes.

Such bodies are particularly located at the inlet of the measuring probe of isotope examining devices and isotope cameras. Their purpose is to hold low the base of the exposure which would be otherwise produced by rays which do not belong to the rays making the picture.

In existing gamma cameras collimators are used the holes of which are made either by perforated sheets which are placed one over the other or by making the holes as tubes which are then glued together. All these procedures have the drawback that the manufacture is expensive and that the stability of the collimator is limited.

An object of the present invention is the provision of a collimator of the described type which is simple and inexpensive in manufacture and has a stable structure.

Other objects of the present invention will become apparent in the course of the following specification.

In the accomplishment of the objectives of the present invention it was found desirable to make all walls of the collimator from strips which extend parallel to each other in their longitudinal directions and are so folded transversely to their longitudinal extension that then two strips are placed next to each other one side of a strip makes a series of holes with an adjacent side of the following strip, the holes having a symmetry axis which coincides with the line separating the two strips.

The collimator made in accordance with the present invention can consist of a very finely linked perforated plate which is different from those known in prior art. In known plates the thickness of intermediate walls cannot be made less than about 2 mm in stamped plates, 0.25 to 0.6 mm in bored plates and about 0.8 mm in little tubes which are glued together, wound or cast. On the other hand according to the present invention intermediate walls can be made the thickness of which can be lowered to 0.05 mm. Furthermore, the present invention avoids that, as in the case of little tubes glued to each other, two adjacent walls would constitute a double wall thickness. On the contrary it is now possible to make walls which join each other with one half wall thickness, so that there are everywhere walls of the same thickness.

The strips or laminas used in accordance with the present invention can be easily made by passing a strip between gear wheels located at corresponding distances from each other. It is advantageous to provide already the strip material with waves the depth and width of which should at least approximately correspond to the final folds, to avoid a tearing or distortion of the strips. As material for the strips lead is generally used since it can be comparatively easily treated. However, other materials which can be shaped as folded strips can be also used.

It is possible to heat the strip to produce sufficient softness prior to folding, with an induction coil or the like.

The invention will appear more clearly from the following detailed description when taken in connection with the accompanying drawing showing by way of example only, a preferred embodiment of the inventive idea.

In the drawing:

FIG. 1 is a front view, partly in section, of a gamma camera provided with a collimator of the present invention.

FIG. 2 is section through an inlet portion of the camera.

FIG. 3 is a diagram showing two interengaging gear wheels for folding a strip of absorbing material.

FIG. 4 is a partial top view of a collimator having the strips folded in accordance with the arrangement of FIG. 3.

FIG. 1 shows a box 1 containing the apparatus used for operating the gamma camera 2. In the lower part 3 of the box 1 are located electrical elements for operating the camera 2. In the upper part 4 of the box 1 is located a viewing device 5 upon which are visible images taken by the camera 2 and transmitted by the conduit 6. A patient 8 resting upon the table has received prior to the photographing a specific dose of radioactive isotopes, for example, Jod 130, which are then fed into the organ being examined, such as the thyroid gland. The camera 2 includes a screening cover 9 which is attached by an arm 10 to the box 1. The actual setting upon the organ being examined takes place at the hinges 11 and 12 which can be used to direct the ray inlet 13 of the image magnifying tube 14 upon the patient 8. Rays emanating from the part of the body being examined fed by the isotopes, pass through the collimator 15 into the image magnifier 14. There they are strengthened electronically and are reproduced by electrodes, the anode 16 of which is visible, upon the light screen 17. A light image produced on the screen is transmitted by light conductors 18 to an optically electronic transformer 19. The electrical measurements produced therein are transmitted by the conduit 6 to the device in box 1 and are represented as pictures upon the screen 5.

FIG. 2 shows in section a part of the collimator 15. It is shown that the light screen 13 is coupled to the image magnifier 14 by an additional fibrous optical device 20.

The size of the strips used in accordance with the present invention for the making of a collimator depends upon the quality of the rays. For example, the making of a collimator for the rays of Tc $99^m$ takes place from strips of lead sheets having a width of 50 mm and a thickness of 0.2 mm. They are produced from a band which prior to the actual folding in the desired profile, is brought into a wave-like shape, namely, is preliminarily folded. The band which is so prepared is then moved as strip 21 between the teeth 22 and 23 of the gear wheels 24 and 25 (FIG. 3). Thus a folded strip 26 is produced the profile of which has half - six corners of the side length of 1 mm. The strip 26 is separated into pieces corresponding to the desired dimensions of the collimator 15. Then, as shown in FIG. 4, they are placed so next to each other that their layers 27 can be provided with visible glue. These glued sections consist of cast resins and are located between walls 28 extending parallel to each other and to diagnols formed by the open side in the half - six corners of the folding of the strip 26. The wall thickness of the cells of the collimator 15 is about 0.2 mm. Thus the sides 28 in the strips are half as thick. This distribution of thicknesses is produced by the shape of teeth 22 which at the side limits are separated from each other to double the extent at the bottom and front surfaces of the half - six corners which determine their shape.

When a band 21 of tungsten is used, the softness required for the folding between the edges 24 and 25 can be produced by heat from the induction coil 29.

What is claimed is:

1. A collimator for a ray diagnosing device, comprising a body having walls which absorbe the rays, said walls consisting of a plurality of strips which extend parallel to each other, each of said strips having a series of uniform and uniformly spaced outwardly extending portions and uniform flat portions between said outwardly extending portions, the flat portions of two adjacent strips engaging each other, the outwardly extending portions of two adjacent strips extending in opposite directions, whereby the strips form a series of parallel holes, wherein each outwardly extending portion consists of a middle part extending parallel to the flat portions and two inclined parts joining the middle part to adjacent flat portions, the interengaging flat portions being glued to each other, and wherein the interengaging portions have one half of the thickness of other strip portions.

2. A device for making for a collimator strips having outwardly extending portions and flat portions, said device comprising two wheels having interengaging teeth, said teeth having the shape of outwardly extending strip portions and having means pressing the flat portions to one-half of their original thickness, the strips being introduced as deformable bands between the teeth.

3. A device in accordance with claim 2, comprising an induction coil heating the strips before they are introduced between the teeth.

* * * * *